(No Model.)

W. P. BUTLER.
OIL LAMP.

No. 314,165. Patented Mar. 17, 1885.

Witnesses
Robt Truitt
J. A. Rutherford

Inventor
William P. Butler.
By James L. Norris.
Atty.

UNITED STATES PATENT OFFICE.

WILLIAM P. BUTLER, OF CHICAGO, ILLINOIS.

OIL-LAMP.

SPECIFICATION forming part of Letters Patent No. 314,165, dated March 17, 1885.

Application filed October 16, 1884. (No model.)

*To all whom it may concern:*

Be it known that I, WILLIAM P. BUTLER, a citizen of the United States, residing at Chicago, Illinois, have invented new and useful Improvements in Lamp-Founts, of which the following is a specification.

My invention relates to oil-lamps, and has for its purpose to provide certain improvements in that class of lamps which are supplied from a vertically-moving cup placed within the fount.

My invention consists in the several novel features of construction and combinations of parts hereinafter fully set forth, and definitely pointed out in the claims.

Figure 1:
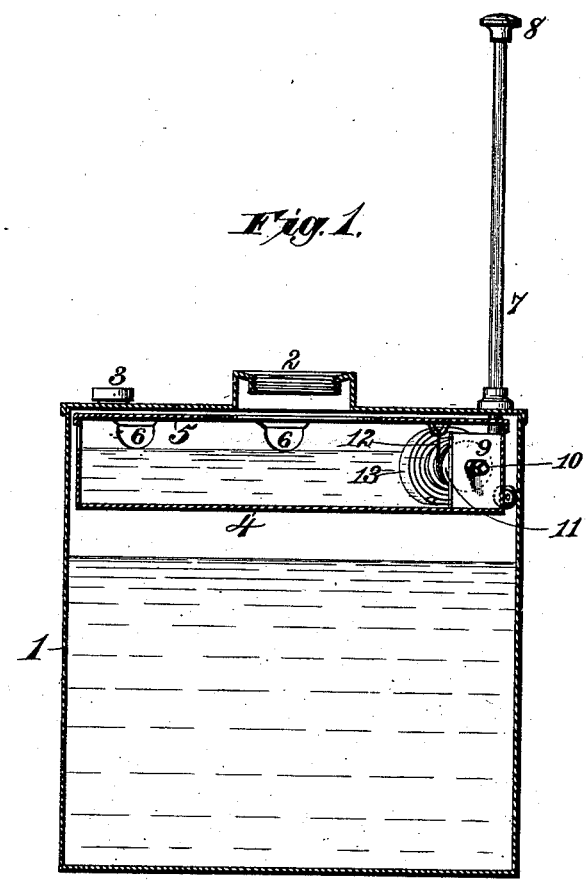
Figure 2:
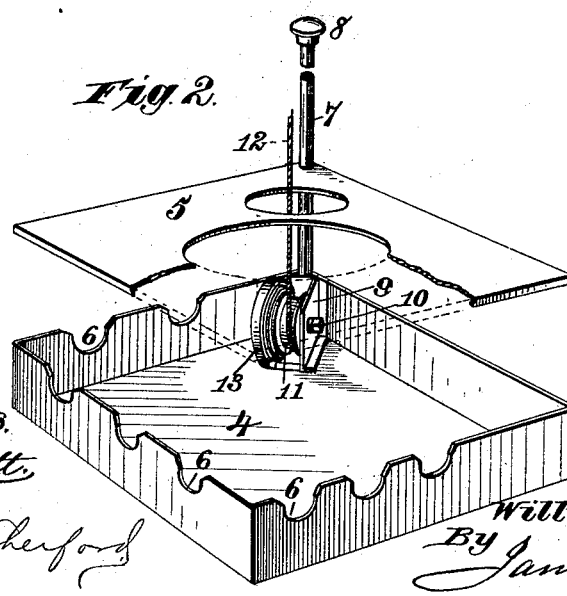

Referring to the drawings, Figure 1 is a vertical section taken centrally through the fount. Fig. 2 is a detail of part of the oil-cup with its attachments.

In the said drawings the reference-number 1 indicates the fount, which may be made of any suitable material and of any desired form. Upon the top of the fount is the usual collar, 2, similar to those upon all oil-lamps, and a filling-aperture, 3, may be formed at any suitable point. Within the fount I place an oil-cup, 4, of such size and shape that it will easily move up and down therein. This cup is provided with a cover, 5, and has a number of oil-openings, 6, upon its sides near the top, to permit the ready admission of oil. Upon one cover of the oil-cup is rigidly attached a rod, 7, which extends upward and passes through the top of the fount, and is provided with a button, 8, or any similar device upon its upper end. Just in front of this rod and journaled in bearings 9, mounted upon the floor of the cup, is a shaft, 10, carrying a drum, 11, around which is wound a cord, 12. To one end of this shaft is attached a spring, 13, which is coiled around the shaft and fastened to the cup. The cord 12 is carried from the drum 11 up to the top of the fount and there fastened. It will now be seen that when it is desired to fill the cup it is only necessary to push down the rod 7, by which means the cup is depressed into the oil in the fount and instantly filled. This depression of the cup, however, causes a rotation of the shaft 10, whereby the spring 13 is wound, while at the same time the cord 12 is drawn off the drum 11. It will be seen, therefore, that after the cup is lowered and filled it will be automatically raised to its proper place by the tension of the spring, which will give rotation to the drum. By this invention the oil is always held up near the burner, and thus the lamp is always full.

When used as a street-lamp the cup will contain just enough oil to supply the lamp for a specified time, when the flame will expire of itself.

The labor of frequent filling is avoided, and by the use of the rigid rod 7 the cup may be filled in an instant by an attendant, who presses down the rod and leaves it to recover its position while he passes on to the next.

What I claim is—

1. The combination, with a lamp-fount, of a vertically-movable interior cup, a rod by which it is depressed, and a drum and spring with a cord wound upon the former, the spring being compressed by the lowering of the cup, and operating to rewind the cord and raise the cup, substantially as described.

2. The combination, with a lamp-fount, of a vertically-movable cup having a depressing-rod attached to it and rising through the fount, a shaft mounted in bearings upon said cup, a spring coiled upon said shaft, and a cord wound upon the drum and attached to the fount, substantially as described.

In testimony whereof I have affixed my signature in presence of two witnesses.

WILLIAM P. BUTLER.

Witnesses:
 S. A. MARTIN,
 GEO. S. MARKHAM.